(12) United States Patent
Jung

(10) Patent No.: US 6,957,711 B2
(45) Date of Patent: Oct. 25, 2005

(54) MOUNTING STRUCTURE FOR VEHICLE'S UPPER RADIATOR

(75) Inventor: In-Kwon Jung, Kyunggi-do (KR)

(73) Assignee: Hyundai Mobis Co., Ltd., Yongin (KR)

( * ) Notice: Subject to any disclaimer, the term of this patent is extended or adjusted under 35 U.S.C. 154(b) by 47 days.

(21) Appl. No.: 10/330,192

(22) Filed: Dec. 30, 2002

(65) Prior Publication Data

US 2004/0011577 A1 Jan. 22, 2004

(30) Foreign Application Priority Data

Jul. 22, 2002 (KR) .................................. 10-2002-0042894

(51) Int. Cl.$^7$ ................................................. B60K 11/04
(52) U.S. Cl. ...................... 180/86.4; 165/67; 248/213.3
(58) Field of Search .............................. 180/68.4, 68.6; 165/67, 69, 149; 248/213.3; 403/324, 322.2

(56) References Cited

U.S. PATENT DOCUMENTS

| | | | | |
|---|---|---|---|---|
| 3,277,767 A | * | 10/1966 | Allen et al. ................. | 411/348 |
| 4,330,030 A | * | 5/1982 | Cate ............................ | 165/67 |
| 4,733,682 A | * | 3/1988 | Ellena ......................... | 135/69 |
| 4,766,968 A | * | 8/1988 | Matsunaga .................. | 180/68.4 |
| 4,858,866 A | * | 8/1989 | Werner ...................... | 248/213.3 |
| 5,544,714 A | * | 8/1996 | May et al. .................. | 180/68.4 |
| 6,331,091 B2 | * | 12/2001 | Cross ........................ | 403/322.2 |
| 6,412,581 B2 | * | 7/2002 | Enomoto et al. .......... | 180/68.4 |
| 6,550,558 B2 | * | 4/2003 | Yorwarth et al. .......... | 180/68.4 |
| 6,675,921 B2 | * | 1/2004 | Brown ...................... | 180/68.4 |

* cited by examiner

Primary Examiner—Christopher P. Ellis
Assistant Examiner—Christopher Bottorff
(74) Attorney, Agent, or Firm—Greenblum & Bernstein, P.L.C.

(57) ABSTRACT

Disclosed is a mounting structure in which an upper radiator of a vehicle is mounted on a chassis. The mounting structure includes: a frame installed right and left sides of an upper tank of a radiator; an insulator inserted on the frame, and having a groove for receiving a pin in its center; a mounting hole formed on a front end carrier positioned on an upper portion of the radiator; a pin inserted into the groove for receiving pin and the mounting hole, for fixing the upper portion of the radiator in the front end carrier. Therefore, the radiator is easily joined to a chassis.

8 Claims, 2 Drawing Sheets

[FIG. 1]
Prior Art
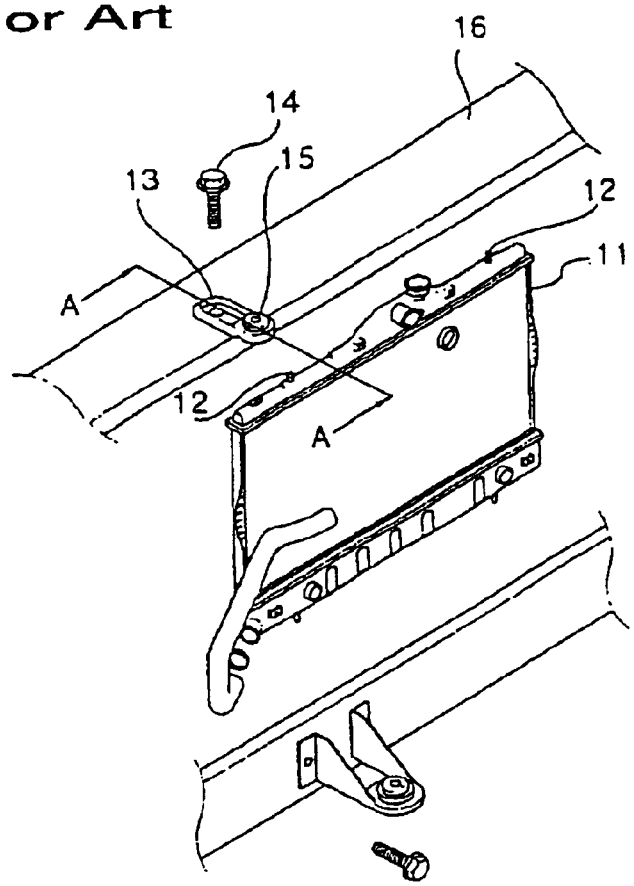
[FIG. 2]
Prior Art
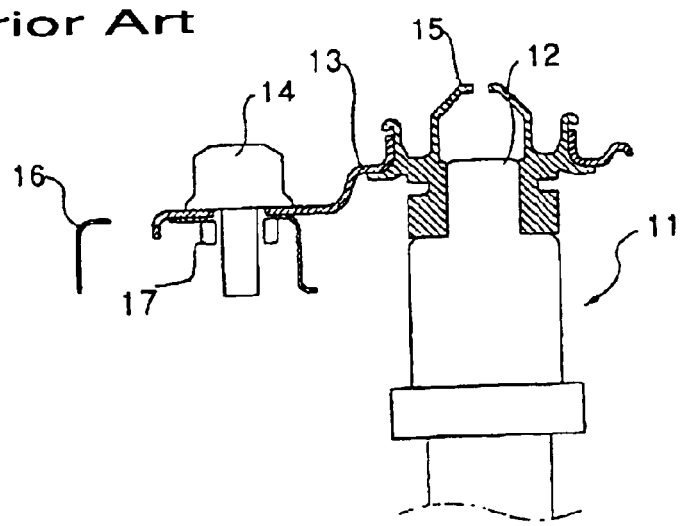

[FIG. 3]
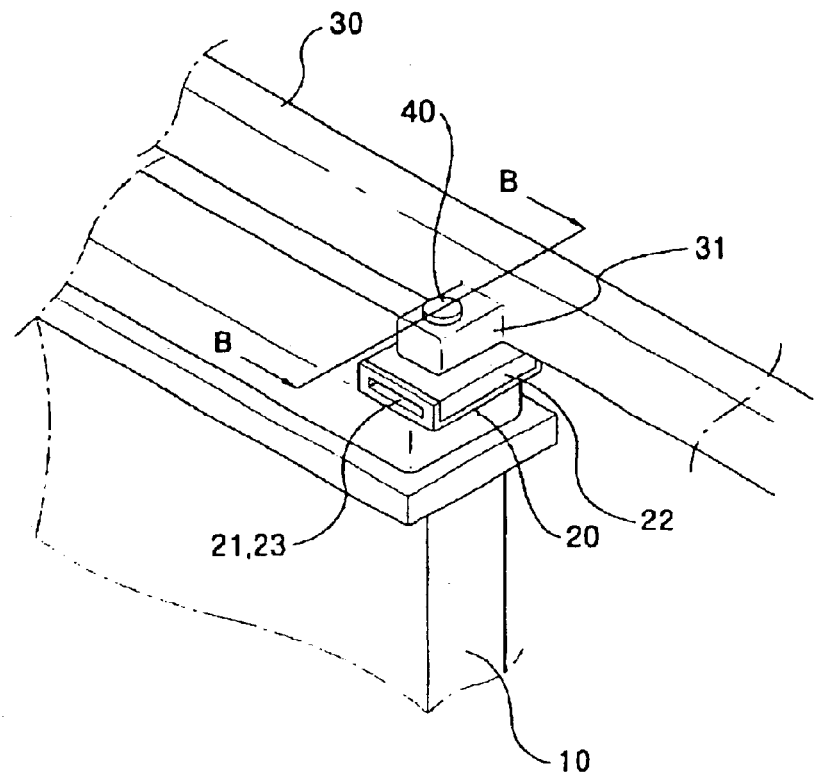
[FIG. 4]
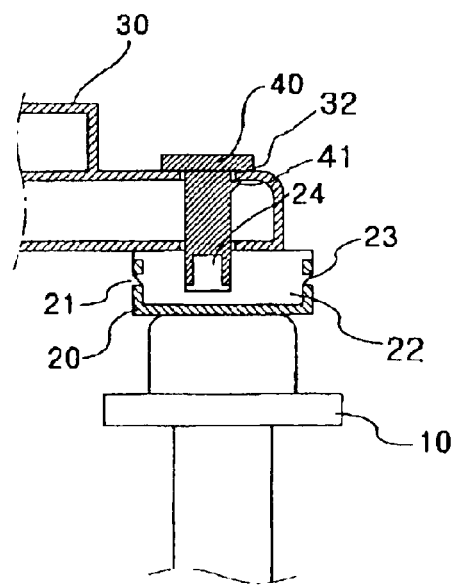

MOUNTING STRUCTURE FOR VEHICLE'S UPPER RADIATOR

BACKGROUND OF THE INVENTION

1. Field of the Invention

The present invention relates to a mounting structure in which an upper radiator of a vehicle is mounted on a chassis and particularly to a mounting structure for upper radiator such that the radiator is easily attached and detached to and from a front end module of a vehicle.

2. Description of the Related Art

As shown in FIG. 1 and FIG. 2, according to the related art, a radiator 11 is mounted on an upper shroud 16 of a chassis through a bracket 13. Protuberances 12 are formed on right and left portions of the radiator 11, a wedding nut 17 of FIG. 2 is joined to the upper shroud 16, so that one side of the bracket 13 is joined to the upper shroud 16 by means of a bolt 14, and the other side of the bracket 13 is inserted into the protuberance 12 after an insulator 15 is assembled. Through such procedure, the upper portion of the radiator 11 is fixed on the chassis, but there are problems that many parts are needed and many efforts are required for assembling procedure. Also, joining of the bracket 13 and the insulator 15 in forcibly fitting manner, is troublesome, and painting on the bracket 13 and the upper shroud 16 upon assembling of the bolt 14, is spoiled and gets rusty.

SUMMARY OF THE INVENTION

To solve the above-indicated problems, it is, therefore, an object of the present invention to provide a mounting structure for an upper radiator of a vehicle such that the radiator is easily assembled to a front end module of a vehicle at low costs.

It is another object of the present invention to provide a mounting structure for an upper radiator of a vehicle such that an insulator for preventing vibration and noise of the radiator, is easily assembled.

It is still another object of the present invention to provide a mounting structure for an upper radiator of a vehicle that doesn't get rusty when exposed to cooling water of high temperature from the radiator even though parts are damaged upon assembling process.

The foregoing and other objects and advantages are realized by providing a mounting structure for upper radiator of a vehicle including: a frame installed right and left sides of an upper tank of a radiator; an insulator inserted on the frame, and having a groove for receiving a pin in its center; a mounting hole formed on a front end carrier positioned on an upper portion of the radiator; a pin inserted into the groove for receiving pin and the mounting hole, for fixing the upper portion of the radiator in the front end carrier. Also, the insulator and the frame of the present invention are joined by means of joining protuberance and groove. For the frame, the front end carrier, and the pin, plastics material is used, not steel material.

BRIEF DESCRIPTION OF THE DRAWINGS

The above objects, features and advantages of the present invention will become more apparent from the following detailed description when taken in conjunction with the accompanying drawings, in which:

FIG. 1 is a perspective view in which a radiator is mounted on a chassis according to the related art;

FIG. 2 is a cross-sectional view of FIG. 1, taken along line A—A;

FIG. 3 is a detailed view of a mounting part of an upper portion of a vehicle's radiator according to the present invention; and FIG. 4 is a cross-sectional view of FIG. 3, taken along line B—B.

DETAILED DESCRIPTION OF THE PREFERRED EMBODIMENT

A preferred embodiment of the present invention will now be described with reference to the accompanying drawings.

In the following description, same drawing reference numerals are used for the same elements even in different drawings.

As shown in FIG. 3 and FIG. 4, the upper portion of a radiator 10 of a vehicle has a structure such that a pin 40 is inserted into a front end carrier 30, whereby the upper portion is simply mounted.

Frames 20 are formed on right and left sides in the upper portion of the radiator 10, and are preferably made of plastics material, having a U shape, and having joining grooves 21 on their both sides.

An insulator 22 has joining protuberances 23 on its both sides, so that when the insulator 22 is inserted into the frame 20, the joining protuberance 23 is joined to the joining groove 21, whereby the insulator 22 is fixed, hard and fast, on the frame 20 conveniently. Preferably, a cross section of the joining protuberance 23 is of a triangle and hook shape. The insulator 22 has a groove 24 for receiving a pin in its center, so that the pin 40 is joined. Generally, the insulator 22 is made of vibroisolating rubber, so that vibration and noise from the radiator 10 are absorbed.

The front end carrier 30 is a housing part of a front end module recently being developed. For the front end module, a bumper, a headlamp, a radiator, a condenser, a fan, a fan shroud, etc. positioned on the front side of a vehicle, are made in form of a module and mounted on a chassis. The front end carrier 30 is positioned on an upper portion of the radiator 10, and is preferably made of plastics material, and a bracket 31 is projected from the front end carrier 30, and a mounting hole 32 for receiving the pin 40 is formed.

The pin 40 is of a nail or a cork shape, and is preferably made of plastics material. The pin 40 is inserted into the mounting hole 32 of the front end carrier 30 and the groove 24 for the pin of the radiator, so that the upper portion of the radiator 10 is mounted on the front end carrier 30. Also, The pin 40 has a protuberance 41 on its side, so that the protuberance 41 is hooked on a lower portion of the mounting hole 32 of the front end carrier 30, whereby detachment of the pin 40 is prevented. The pin 40 could be fixed into the front end carrier 30 in forcibly fitting manner depending on cases.

As is apparent from the foregoing, according to the present invention, the radiator is easily joined to the front end module of a vehicle by simple work of pin insertion with low costs. Also, according to the present invention, the insulator is easily joined by combination of the joining protuberance and the joining groove, not by forcibly fitting manner. Also, the mounting part is made of plastics material. Therefore, the mounting part doesn't get rusty when exposed to cooling water of high temperature from the radiator even though parts are damaged upon assembling process.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A mounting structure for a vehicle radiator, comprising:
    a generally U-shaped frame, said frame including a base and a pair of side walls connected thereto at opposite edges of the base and extending generally perpendicularly therefrom, said frame being installed on at least one of a right and left side of an upper tank of a radiator, said frame having a joining groove on each side wall;
    an insulator having a groove and having a joining protuberance on opposite sides thereof, said insulator insertable on said frame, so that each joining protuberance is joined to a corresponding joining groove;
    a separate pin insertable into said groove; and
    a mounting hole formed on a front end carrier positioned adjacent an upper portion of the radiator;
    wherein said pin is insertable through the mounting hole and into the groove, said pin configured to affix the upper portion of the radiator to the front end carrier.

2. The mounting structure according to claim 1, wherein a protuberance is formed on a side of the pin and the protuberance is hooked on a lower portion of the mounting hole when the pin is inserted into the groove and the mounting hole.

3. The mounting structure according to claim 1, wherein at least one of the frame, the front end carrier, and the pin are made of plastic.

4. The mounting structure according to claim 2, wherein at least one of the frame, the front end carrier, and the pin are made of plastic.

5. A mounting structure for mounting a vehicle radiator to a front end carrier of a vehicle, the front end carrier having a mounting hole, said mounting structure comprising:
    a frame installed on at least one of a right and left side of an upper tank of a radiator, said frame including a base and a pair of side walls connected thereto at opposite edges of the base and extending generally perpendicular thereto to define a generally U-shaped cross-sectional configuration, said frame having a joining groove on each side wall;
    an insulator having a groove and having a joining protuberance on opposite sides thereof, said insulator being inserted in the frame, so that each joining protuberance is joined to a corresponding joining groove; and
    a separate pin configured to affix the radiator to the front end carrier, said pin being insertable into said groove;
    wherein when an upper portion of the radiator is positioned adjacent the front end carrier, said pin is insertable through the mounting hole and into said groove to affix the radiator to the front end carrier.

6. The mounting structure according to claim 5, wherein a protuberance is formed on a side of the pin and the protuberance is hooked on a lower portion of the mounting hole when the pin is inserted into the groove and the mounting hole.

7. The mounting structure according to claim 5, wherein at least one of the frame, the front end carrier, and the pin are made of plastic.

8. The mounting structure according to claim 6, wherein at least one of the frame, the front end carrier, and the pin are made of plastic.

* * * * *